Nov. 20, 1934.  E. H. BUNCE ET AL  1,981,028
METALLURGICAL FURNACE
Filed Aug. 16, 1930  3 Sheets-Sheet 1

INVENTORS
EARL H. BUNCE
ALFRED O. ASHMAN
BY
ATTORNEYS

Nov. 20, 1934. E. H. BUNCE ET AL 1,981,028
METALLURGICAL FURNACE
Filed Aug. 16, 1930 3 Sheets-Sheet 3

INVENTORS
EARL H. BUNCE
ALFRED O. ASHMAN
BY
ATTORNEYS

Patented Nov. 20, 1934

1,981,028

UNITED STATES PATENT OFFICE 1,981,028

METALLURGICAL FURNACE

Earl Hamlin Bunce and Alfred Owen Ashman, Palmerton, Pa., assignors to The New Jersey Zinc Company, New York, N. Y., a corporation of New Jersey Application August 16, 1930, Serial No. 475,690

8 Claims. (Cl. 75—22.5)

This invention relates to the reduction of zinciferous material and has for its object certain improvements in the method of reducing zinciferous material. The invention relates more particularly to certain improvements in the reduction of zinciferous material by passing a current of electricity through the same.

It has heretofore been proposed to effect the reduction of zinciferous material by passing a current of electricity through the same. Among the several proposals that have been advanced to heat directly a charge of zinc ore and coal is that of passing a current of electricity through a loose mixture of the same. That is to say, a loose mixture of the finely divided zinciferous material and carbonaceous reducing agent is confined within a reduction retort, and a current of electricity is passed through the charge; the charge itself acting as a conductor of the electricity. This process is not practicable for the reason that a loose mixture provides too great a resistance to the passage of an electric current. Furthermore, this process has not been developed economically in the past, principally because of the non-uniform resistance offered by the loose charge.

The variable conductivity of a loose charge causes the current to flow irregularly through the charge cross-section with resulting irregularity in heating and reduction. The local overheating that results tends to drive the zinc out of the charge in spots; the gaps in the charge caused by the shrinkage of the exhausted residue in these spots interfere further with the conductivity, and cause further irregularity in heating. Numerous local arcs are formed at the points of contact between the loose charge and the electrodes, and sometimes through the body of the charge. These arcs cause the residue to fuse onto the electrodes, on account of the intense local heating that they produce; and likewise tend to create a quantity of fine dust on account of the well-known phenomenon of sputtering.

It has been found by experience that the zinc vapor evolved by an electrothermal furnace smelting a loose charge is extremly difficult to condense to molten zinc, zinc dust being formed predominantly. This difficulty is due in large part to the use of a cold charge with introduction of air; to dust formation caused by the sputtering of arcs in the charge; to the irregular evolution of zinc vapor in puffs caused by the irregular heating described above; and to the resistance to the escape of the zinc vapor offered by the loose charge—a resistance intensified by the partial scorification of the charge and its adhesion to the contact electrodes and the walls of the retort on account of the local overheating pointed out above. This irregular evolution of zinc vapor renders it difficult to condense the zinc vapor to a molten regulus and facilitates the formation of zinc dust or blue powder.

In order to avoid the inherent disadvantages of a loose charge, it has also been proposed to fill reduction retorts with densely pressed mixtures of zinciferous material and carbonaceous reducing agent. Thus, cylindrical retorts vertically disposed have been filled with large massive columnar briquettes placed end to end which are adapted to fill the retort with a substantially continuous and solid column of charge material; the briquette column having an outside diameter approximately as large as the inside diameter of the retort. A current of electricity is then passed through the solid column of charge material. This proposal, too, does not appear to have been successfully practiced.

While a current of electricity may more readily be passed through a column of densely pressed material than through a loose mixture of charge materials, the use of a homogeneous column of densely pressed charge material of substantially the same contour as the retort is otherwise objectionable. Unless the columnar briquette has a relatively small cross-section, the evolved retort gases and liberated zinc vapor have little or no opportunity to escape to the side surfaces thereof. Moreover, owing to the dense nature of the columnar briquette throughout its height, there is no opportunity for the gases and vapor to rise within the briquette body.

Furthermore, the conductivity of such a columnar briquette or stack of cylindrical or disc-shaped briquettes will tend to vary irregularly on account of shrinkage during reduction, with resulting difficulty in maintaining good contact with the electrodes and between the individual briquettes, and also on account of the cracking and disintegration of the briquettes, because of reduction of zinc and consequent weakness of the structure of the briquette.

Another disadvantage of the use of such columnar briquettes is that their use renders it necessary to adopt a system of batch operation, on account of the difficulty of passing such briquettes continuously through the retort. Also, briquettes of this type are expensive and difficult to manufacture.

Such proposals as have heretofore been made directly to heat a charge of zinciferous material and carbonaceous reducing agent by passing a current of electricity through the same do not appear to have been successfully practiced for the production of slab zinc, since the product is chiefly zinc dust. Furthermore, these furnaces use a combination of arc and resistance heating. Practically all zinc reduction processes are conducted by the application of heat indirectly. For this purpose, the charge materials, as above, are confined within an externally heated retort, the reduction retort usually resting in a heating chamber which is filled with hot combustion gases. In order to drive sufficient heat to the center or core of the charge, a very large amount of heat at highly elevated temperatures must be applied to the outside of the retort walls. In the case of a retort constructed of refractory materials, an outside temperature of 1350° C. is not uncommon. The temperature actually required for reduction need not, however, exceed 950° to 1000° C. It is thus seen that a very large excess of heat is required to effect the reduction of zinc ores when heated indirectly.

While heat may be directly applied to the zinciferous material for purposes of reduction by bringing the same into direct contact with hot combustion gases, this procedure is objectionable because the combustion gases tend seriously to impair the subsequent zinc vapor treatment operation. Thus, if the zinc vapor is to be condensed to zinc metal, the combustion gases unduly dilute the zinc vapor which seriously impairs the efficiency of the condensing action. If the zinc vapor is to be burned for the production of zinc oxide, the zinc oxide adsorbs the impurities present in the combustion gases, in particular sulfur compounds and thus becomes unduly contaminated. Furthermore, as the combustion gases sweep through the charge materials, they lift dust particles and the like from the charge materials which are conveyed to the condenser where they prove highly objectionable. Such impurities are highly objectionable whether the ultimate product to be obtained by treatment of the zinc vapor be metallic zinc, zinc oxide, or zinc dust.

It will therefore be apparent that if the charge materials could be directly heated in a clean way, and in a manner not to dilute the resulting zinc vapor with excess gases, such a procedure would be highly desirable. As a result of our investigations, we have determined that appropriately agglomerated zinciferous materials may thus be directly heated by passing a current of electricity through the same.

The present invention contemplates a method of effecting the reduction of zinciferous material by passing a current of electricity through the same. Thus, an agglomerated charge of mixed zinciferous material and carbonaceous reducing agent is confined within a retort, the minimum cross-sectional dimension of which is at least several times greater than the maximum cross-sectional dimension of the agglomerates. The agglomerates are present in the retort in relatively large numbers, thereby being adapted to provide spaces between contacting agglomerates through which hot retort gases and liberated zinc vapor may freely pass but at the same time offering sufficient contact with one another so as to set up a continuous conductor for the passage of a current of electricity through the agglomerates and from one agglomerate to another. Agglomerates of this character impart to the charge as a whole a substantially uniform and adequate porosity for the passage therethrough of the gaseous products of the reducing action.

As a result of our investigations, we have determined that an agglomerated charge of the character stated is particularly amenable to direct heating by the passage of a current of electricity through the agglomerates. The current of electricity is advantageously passed through the agglomerates while the agglomerates themselves are progressively advanced through the reduction zone, so that the agglomerates are heated in transit. Such progressive movement of the agglomerates may be obtained, for example, when they are moved through the reduction chamber, such as through a vertically disposed retort by the action of gravity.

The electric resistance of the charge can be regulated by varying the size and shape of the agglomerates. The smaller the agglomerates, the greater the number of contacts between them, and consequently the lower the resistance. The greater the divergence of the shape of the briquettes from spherical form (that is, the flatter their surfaces) the larger their contact areas, and the lower their resistance.

Various procedures may be followed in causing the current of electricity to pass through the agglomerates. In the case of a vertically disposed chamber, for example, an electrode in contact with the agglomerates may be provided at or near the upper end of the chamber, with a similarly positioned electrode at or near the lower end thereof. The practice of the invention is particularly efficacious when the main body of agglomerates confined within a vertically disposed reduction chamber is sub-divided to form two or more lower columns of agglomerates, which terminate in an upper or central body of agglomerates; the lower columns, however, being in communication with one another at or near their upper ends. Under such operating conditions, the current of electricity is then preferably passed through the columns of briquettes. When operating in this manner, an electrode is placed at or near the bottom of each lower column of agglomerates.

Alternating current will ordinarily be used in commercial practice, on account of the possibility of transforming such current to an appropriate voltage, and for other obvious reasons; though it is evident that no change in the principles of the invention would be created by the use of direct current. In case three-phase current is used, three electrodes should of course be used, and the main body of agglomerates divided into three lower columns, the bottom of each column being equipped with an electrode.

If the main body of agglomerates confined within the reduction chamber are sub-divided to form a plurality of lower columns, which are in communication with one another, so that sufficient contact is provided to form a conductor for the passage of the electricity, the upper portion of the agglomerates may be employed as an eliminator. As pointed out in U. S. Patents 1,749,126 and 1,748,242, a body of agglomerated charge materials about to be subjected to a reduction operation may be employed to eliminate lead and the like out of zinc vapor contaminated with the same. For this purpose, the upper body of agglomerates must be maintained at a temperature adapted selectively to eliminate the lead while permitting the substantially lead-free zinc vapor to pass into whatever zinc vapor treatment device is employed.

No practical current conductivity appears to be obtained unless the agglomerates have reached a temperature in the neighborhood of about 700° C. An effective working range may be obtained with lower and upper temperature limits of 700–1250° C., respectively. The temperature of lowest resistance, which may be termed the critical temperature, appears to be between 1000 and 1100° C. It is of course desired for practical reasons to effect the heating of the agglomerated charge with a current at relatively low voltages.

On account of the fact that the agglomerates do not become conductive till hot, we prefer to charge the agglomerates into the furnace in preheated condition. In our present preferred practice of the invention, the agglomerates are coked, and may advantageously be of the types and forms described in U. S. Patent No. 1,712,132. The coked agglomerates are discharged red-hot from the coking furnace into buckets and are immediately hoisted to the charging hopper of the electric resistance smelting furnace, where they are charged into the furnace while still hot enough to possess substantial electric conductivity.

In case coked agglomerates are not used, or in case it is desired to cool the coked agglomerates for any reason prior to charging them into the smelting furnace, the electric resistance furnace may be equipped with a charging tube for preheating (preferably of metal) through which the agglomerates progressively pass on their way to the electric resistance smelting chamber. This preheating tube is externally heated in the known manner by gas firing or the like, being surrounded by a combustion chamber for burning gas or other fuel. The top of the preheating tube may serve as a lead eliminator, it being in that case carried above the combustion chamber; or a separately mounted lead eliminator may be mounted above the tube, and communicating directly with it. The preheating of the charge in the preheating tube may be carried to such a temperature that the reduction of the zinc ore in the charge begins in this tube; in fact, the external heating of this tube may be so adjusted that it operates as a zinc distilling retort though the elimination of zinc from the charge will not of course be completed in the metal preheating tube.

These and other characteristics of the present invention may perhaps best be understood if reference is made to the accompanying drawings, taken in conjunction with the following description, in which.

Figure 1:
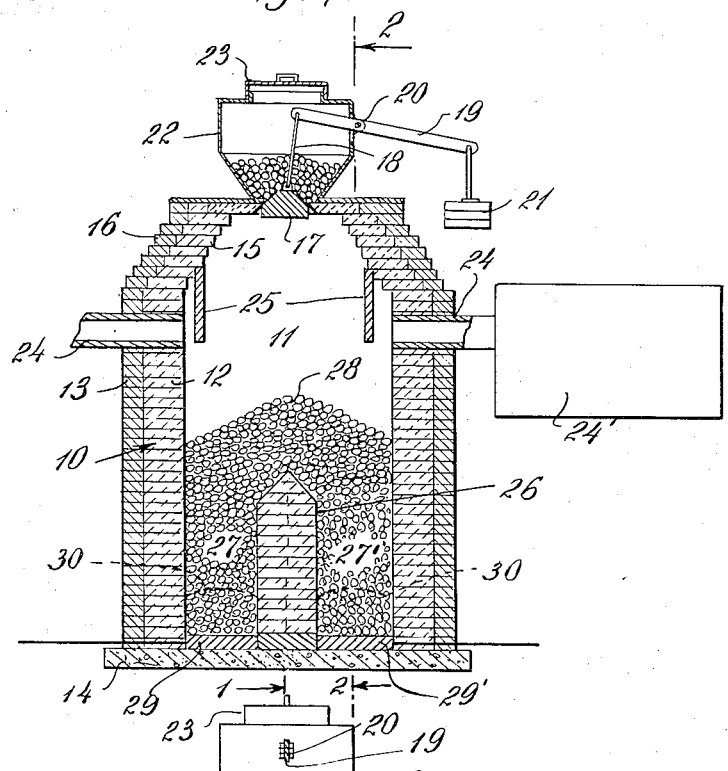
Fig. 1 is a side elevation in section of a metallurgical furnace adapted for the practice of the invention.

The apparatus shown (see Fig. 1) comprises a reduction furnace 10 consisting of a main chamber 11 defined by refractory lined walls 12 and an outer facing of brick 13, all of which rest upon a concrete foundation 14. The upper portion of the reduction furnace consists of a stepped-in ceiling, also having a refractory lining 15 and an outer facing of brick 16. The stepped-in ceiling terminates in a charge-opening, into which a counter-weighted closing device 17 is adapted to fit snugly. This device is attached by means of an arm 18 to one end of a supporting cross-member 19 adapted to rock on a fulcrum 20. Counter-weights 21 are located at the other end of the cross-arm. A charging hopper 22 rests on the top of and over the charge-opening into the furnace structure. It is provided with a removable lid 23.

One or more vapor and gas discharge conduits 24 are provided at or near the upper end of the reduction chamber. These discharge conduits communicate with a zinc vapor treatment device 24'. Baffles 25 extend from the ceiling portion of the reduction chamber downwardly across and spaced from the openings in the furnace linings leading into the discharge conduits. These baffles are adapted to keep charge materials out of the discharge conduits.

One or more upright separating walls or partitions 26 are provided in the lower portion of the reduction chamber, so as to divide the same into a plurality of lower compartments 27 and 27'. The upper ends of the lower compartments communicate freely with the upper portions of the reduction chamber. In order to avoid short-circuits, the dividing partitions or walls are constructed of suitable electrical non-conducting material. The usual refractory materials are adapted for this purpose. The use of dividing walls permits a sub-division of a main body of agglomerated charge materials 28 into a plurality of relatively smaller bodies.

Electrodes 29 and 29' are located at the bottoms of each lower compartment, each electrode being connected with a source of electrical current (not shown). In this manner a current of electricity may be passed from one electrode to another, the intervening agglomerates forming a conductor for the passage of an electrical current.

Figure 2:
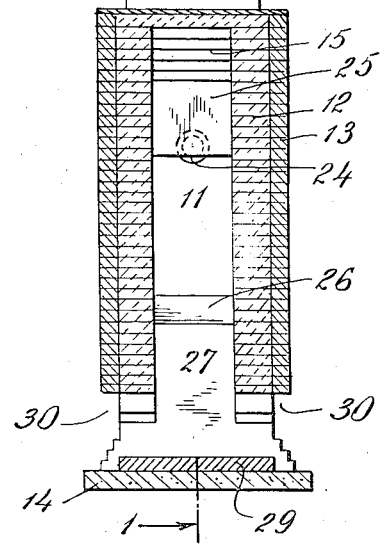
Fig. 2 is an end elevation in section on the line 2—2 of Fig. 1.

If reference is now more particularly made to Fig. 2, it will be seen that openings 30 are provided in the lower portion of the reduction furnace for the withdrawal of spent residues. Two such openings are preferably provided for each lower compartment, although it will be evident that one alone may be employed.

Figure 3:
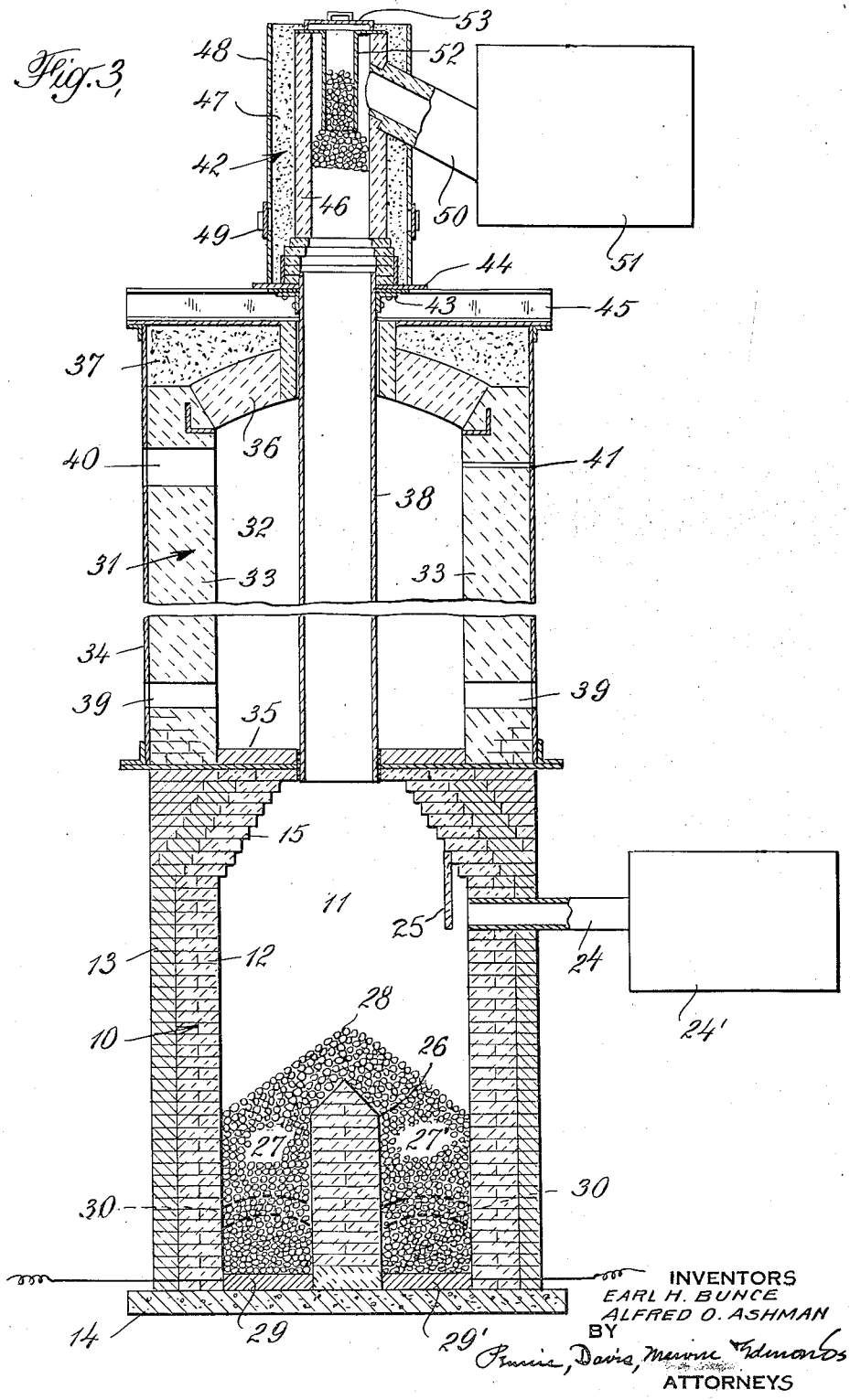
Fig. 3 is a side elevation in section of a modified form of apparatus adapted for successive indirect and direct heating of the charge materials.

The modified form of apparatus in Fig. 3 consists essentially of a preheating unit 31 used in conjunction with the specific reduction unit described above. This upper unit comprises a heating chamber or laboratory 32 defined by side walls 33 constructed of refractory brick. An outer metallic casing 34 completely surrounds the side walls. The bottom of the heating chamber consists of a refractory lining 35. The ceiling consists of an arched roof 36, also constructed of refractory brick. Heat-insulating material 37, such as diatomaceous earth, or the like, is provided in the space between the arched roof and the top of the reduction unit.

An upright retort 38, preferably constructed of metal or an alloy of metals, is suspended centrally of the heating chamber, its lower end communicating freely with the reduction chamber of the lower unit, to which it is connected by a telescope joint. One or more openings 39 are preferably located at or near the lower end of the heating chamber, which are adapted for the introduction of a suitable mixture of air and fuel to be consumed therein. An opening 40 for the withdrawal of spent combustion gases is located at or near the upper end of the heating chamber, which communicates with a stack or chimney (not shown). A number of relatively small holes 41 adapted for the insertion of pyrometers are located at spaced intervals throughout the height of the side walls of the heating chamber.

The upper end of the metal retort section connects with a superposed lead eliminator structure 42. Lugs 43 are attached to the upper end of the retort, which are in turn fastened to an annular metal plate 44 resting on supporting I-beams 45. The lead eliminator structure consists of an upright eliminator tube 46, surrounded by a layer of heat-insulating material 47, such as coal dust. An outer metallic casing 48 is spaced from the lead eliminator tube so as to provide space for the heat-insulating material. A door, or doors, 49 is located in the metallic casing at or near its lower end for the withdrawal of heat-insulating material.

A vapor and gas discharge conduit 50 leads from the eliminator tube at or near its upper end to a zinc vapor treatment device 51. If zinc metal is to be recovered, this device consists of a suitable condenser. If zinc oxide is to be manufactured, the device consists of an apparatus that permits the zinc vapor to burn to zinc oxide. Thus, the device may comprise means for directing a blast of oxidizing air into the zinc vapor. If zinc dust is to be made, the device consists of a canister that is adapted to condense the incoming zinc vapor into minute particles of zinc.

A charging device 52 fits into the upper open end of the eliminator tube, and extends a convenient distance into the same; preferably to a point at which charge materials will not enter the vapor-gas discharge conduit. A removable cover 53 fits over the charging device.

Figure 4:
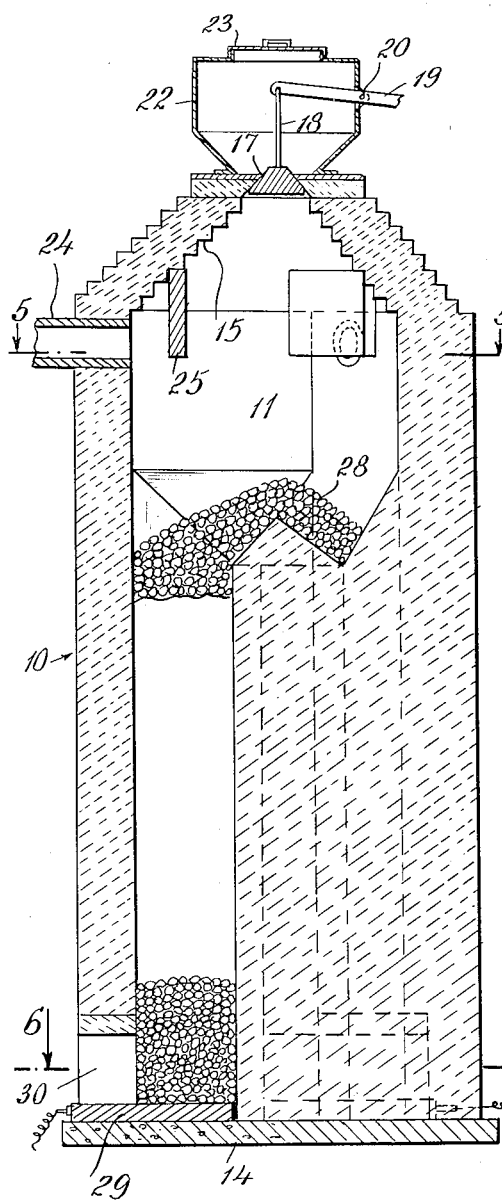
Fig. 4 is a side elevation in section of another modified form of a metallurgical furnace adapted for the practice of the invention, showing the use of a three-electrode furnace employable with poly-phase current.
Figure 5:
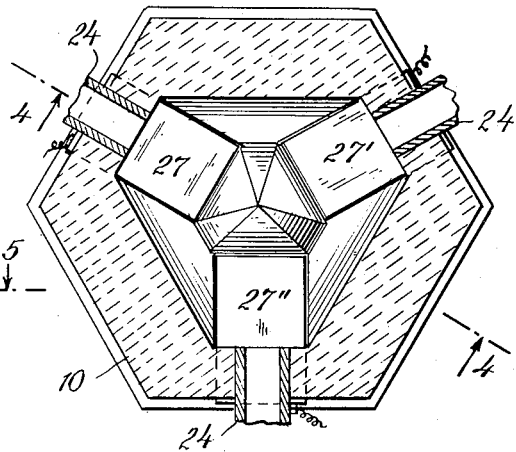
Fig. 5 is a section on the line 5—5 of Fig. 4.
Figure 6:
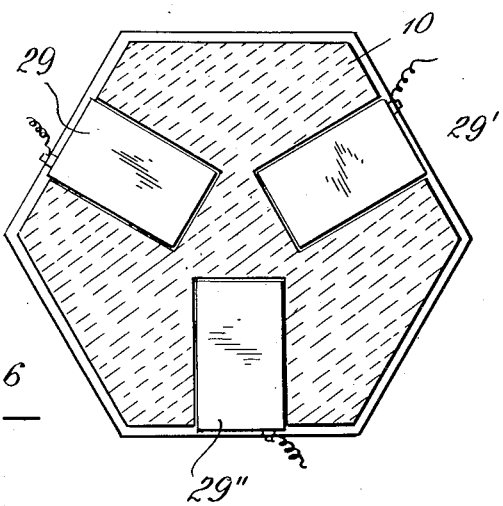
Fig. 6 is a section on the line 6—6 of Fig. 4.

In the case of Figs. 4, 5 and 6, another modified form of metallurgical furnace is shown, in which three electrodes may be employed that are connected to a poly-phase current supply. Three electrodes 29, 29' and 29'' are located at the bottom of the lower compartments 27, 27' and 27'', respectively. The furnace is otherwise constructed in a manner similar to that shown in Figs. 1 and 2; and is operated in substantially the same manner, except for the electrical connections to obtain the desired resistance heating.

The above described apparatus may be operated as follows in the practice of the process of the invention:

In the case of the apparatus more particularly shown in Figs. 1 and 2, the removable lid 23 is lifted away, and hot coked agglomerated charge materials 28 are introduced into the charging hopper 22, after which the lid is returned. The agglomerates are preferably prepared by intimately mixing finely divided zinc ore with carbonaceous fuel consisting at least in part of coking coal, briquetting the mixture under high pressure, and coking the resulting briquettes. In order to introduce the agglomerates into the reduction chamber 11, the counterweights 21 are pushed upwardly, or one or two of the weights are removed, and the closing device 17 is dropped downwardly, whereupon the agglomerates drop downwardly. A sufficient number of agglomerates are thus dropped until the reduction chamber is substantially full. In the preferred practice of the invention, the reduction chamber is always kept substantially full of agglomerates.

The charge is then electrothermally smelted by passing a current of electricity through the electrodes 29 and the agglomerates 28, the zinc vapor evolved being conducted into the zinc vapor treatment device 24'.

Spent residues are periodically withdrawn through the openings 30. When this is done, the level of the agglomerates confined within the reduction chamber 11 is lowered. In order to make the process substantially continuous, further amounts of freshly coked hot agglomerated charge materials are dropped from the charging hopper 22 into the main reduction chamber.

With a charging device of the type shown, vapor pressure conditions within the reduction chamber are not materially altered during the charging operation. Thus, the lid 23 is removed and a batch of charge materials is introduced into the charging hopper while the closing device 17 fits snugly into the opening leading from the hopper to the reduction chamber. The lid is then returned, after which the closing device 17 is lowered and the agglomerates are permitted to drop into the reduction chamber.

In the preferred practice of the invention, air in regulated amount, or other appropriate gas, or mixture of gases, is admitted through the openings 30 into the reduction chamber by the method of stack draft control disclosed in copending application Serial No. 180,107 of F. G. Breyer, filed April 1, 1927 (which has since issued into United State Patent No. 1,811,910, dated June 30, 1931). On the other hand, if it is desired to exclude air, suitable means may be provided for sealing the spent residue discharge openings, at least while residues are not being removed.

In the apparatus more particularly shown in Fig. 3, a somewhat different procedure may be followed. The lid 53 is removed, and the continuous shaft or passageway leading down to the electrodes 29 is substantially completely filled with agglomerated charge materials; after which the lid is returned.

In order to effect the preheating of agglomerates confined in the metal retort section 38, a suitable admixture of air and fuel is introduced through the ports 39, to be consumed within the heating chamber or laboratory 32. The highly heated gases circulate about the metal retort, and ultimately find their way through the opening 40 to a stack or chimney (not shown).

Metal retort sections now readily available on the market will not withstand operating temperatures much in excess of 1100° C. For that reason, the temperature of the wall of the metal preheating tube is kept not higher than about 1100° C., and preferably not lower than about 900° C. A temperature of about 1000° C. is well adapted for the practice of the invention.

The preheated agglomerates are then progressively moved into the lower reduction unit 10, where they are smelted by electric resistance heating. Sufficient resistance to the passage of the current is set up in the agglomerates to bring them to their temperature of reduction.

The zinc vapors liberated pass up through the preheater 38 and the lead eliminator 42, then through the outlet 50 into the zinc vapor treatment apparatus 51. If desired, a vapor discharge conduit 24 exiting into a vapor treatment device 24', similar to that shown in Fig. 1 may also be provided; in this case the zinc product obtained from the device 24' will be of a lower degree of purity than that obtained from 51, since it has not passed through the lead eliminator.

Spent residues are withdrawn through the openings 30 from time to time, whereupon fresh agglomerates are introduced into the feeding device 52. In this manner the process may be operated substantially continuously.

We claim:

1. In the method of reducing an agglomerated charge of mixed zinciferous material and carbonaceous reducing agent confined in a vertically disposed retort, the minimum cross-sectional dimension of which is at least several times greater than the maximum cross-sectional dimension of the agglomerates, said agglomerates being present in a relatively large number and adapted to provide spaces between contacting agglomerates through which hot retort gases and liberated zinc vapor may freely pass, the improvement which comprises sub-dividing the body of agglomerates into at least two lower columns which merge with an upper column, and heating the agglomerates to their temperature of reduction by passing a current of electricity through the same.

2. In the method of reducing an agglomerated charge of mixed zinciferous material and carbonaceous reducing agent confined in a vertically disposed retort, the minimum cross-sectional dimension of which is at least several times greater than the maximum cross-sectional dimension of the agglomerates, said agglomerates being present in a relatively large number and adapted to provide spaces between contacting agglomerates through which hot retort gases and liberated zinc vapor may freely pass, the improvement which comprises sub-dividing the body of agglomerates into at least two lower columns which merge with an upper column, and heating the agglomerates in the lower columns by electric resistance.

3. In the method of reducing an agglomerated charge of mixed zinciferous material and carbonaceous reducing agent confined in a vertically disposed retort, the minimum cross-sectional dimension of which is at least several times greater than the maximum cross-sectional dimension of the agglomerates, said agglomerates being present in a relatively large number and adapted to provide spaces between contacting agglomerates through which hot retort gases and liberated zinc vapor may freely pass, the improvement which comprises sub-dividing the body of agglomerates into at least two lower columns which merge with an upper column, heating the agglomerates in the lower columns by electric resistance whereby retort gases are evolved and zinc vapor is liberated, and passing the gases and vapor through the upper column of agglomerates, said upper column of agglomerates acting as an eliminating medium to remove objectionable impurities present in the liberated zinc vapor.

4. The method of reducing an agglomerated charge of mixed zinciferous material and carbonaceous reducing agent which comprises progressively passing a column of the agglomerated charge through a vertically disposed and externally heated metal retort in which reduction is in part effected, sub-dividing the body of hot and partially smelted agglomerates into at least two lower columns, and heating the agglomerates in the lower columns by electric resistance, to complete the reduction operation.

5. The method of reducing a porous charge of agglomerates of mixed zinciferous material and carbonaceous material which comprises dividing the charge within an appropriate reducing chamber into at least two columnar bodies merging at one end in a common body serving to conduct electric current from one columnar body to another, and electrically heating the charge by contacting each columnar body at a point remote from said common body with one terminal of a source of electric energy.

6. The method of reducing a porous charge of agglomerates of mixed zinciferous material and carbonaceous material which comprises dividing the charge within an appropriate reducing chamber into at least two substantially upright columnar bodies merging at their tops in an overlying common body of charge, and electrically heating the charge by contacting each columnar body approximate the lower end thereof with one terminal of a source of electric energy.

7. The method of reducing a porous charge of agglomerates of mixed zinciferous material and carbonaceous material which comprises dividing the charge within an appropriate reducing chamber into at least two substantially upright columnar bodies merging at their tops in an overlying common body of charge, each columnar body of charge being in contact with and supported, in part at least, by an electrode element, and electrically heating the charge by connecting said electrode elements to a source of electric energy.

8. The method of reducing zinciferous material which comprises preheating a porous charge of agglomerates of mixed zinciferous material and carbonaceous material, progressively passing the said preheated charge through a reducing chamber, said charge being in contact with and supported in part at least by an electrode element connected to a source of electric energy, heating the charge in the course of its passage through said chamber by an electric current supplied by said source of electric energy and passing through the charge, whereby the zinciferous material is reduced and zinc vapor evolved, and conducting the zinc vapor from the furnace in such manner that it traverses the preheated charge whereby lead is eliminated from the zinc vapor.

EARL HAMLIN BUNCE.
ALFRED OWEN ASHMAN.